United States Patent
Keshavamurthy et al.

(10) Patent No.: US 11,407,432 B2
(45) Date of Patent: Aug. 9, 2022

(54) CONNECTIVITY-ENABLED TRAFFIC-AWARE SUPPLEMENTAL SENSOR CONTROL FOR INFORMED DRIVING

(71) Applicant: Toyota Motor Engineering & Manufacturing North America, Inc., Plano, TX (US)

(72) Inventors: Shalini Keshavamurthy, Sunnyvale, CA (US); Seyhan Ucar, Mountain View, CA (US); Kentaro Oguchi, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 97 days.

(21) Appl. No.: 16/863,254

(22) Filed: Apr. 30, 2020

(65) Prior Publication Data
US 2021/0339776 A1 Nov. 4, 2021

(51) Int. Cl.
*B60W 60/00* (2020.01)
*G01C 21/34* (2006.01)
*G06V 10/25* (2022.01)
*G06V 20/56* (2022.01)

(52) U.S. Cl.
CPC .. *B60W 60/00274* (2020.02); *B60W 60/0011* (2020.02); *B60W 60/0025* (2020.02); *G01C 21/3461* (2013.01); *G06V 10/25* (2022.01); *G06V 20/56* (2022.01)

(58) Field of Classification Search
None
See application file for complete search history.

(56) References Cited

U.S. PATENT DOCUMENTS

| | | | |
|---|---|---|---|
| 4,810,022 A | 3/1989 | Takagi et al. |
| 6,141,610 A | 10/2000 | Rothert et al. |
| 6,151,539 A | 11/2000 | Bergholz et al. |
| 6,237,565 B1 | 5/2001 | Engelgau et al. |
| 6,566,831 B1 | 5/2003 | Waite |
| 8,044,781 B2 | 10/2011 | Laubinger et al. |
| 9,373,149 B2 | 6/2016 | Abhyanker |
| 9,744,907 B2 | 8/2017 | Boehm |
| 10,134,278 B1 | 11/2018 | Konrardy et al. |

(Continued)

*Primary Examiner* — James J Lee
*Assistant Examiner* — Tawri M Matsushige
(74) *Attorney, Agent, or Firm* — Christopher G. Darrow; Darrow Mustafa PC

(57) ABSTRACT

A sensor control system for a vehicle includes one or more processors and a memory communicably coupled to the one or more processors. The memory stores a zone of interest determination module including computer-readable instructions that when executed by the one or more processors cause the one or more processors to determine if at least one localized zone of interest resides within a preliminary zone of interest of the vehicle. The memory also stores a sensor control module including computer-readable instructions that when executed by the one or more processors cause the one or more processors to control one or more operational parameters of at least one sensor so as to, if at least one localized zone of interest resides within the preliminary zone of interest, bring at least a portion of the at least one localized zone of interest into a of field view of the at least one sensor.

19 Claims, 6 Drawing Sheets

(56) References Cited

U.S. PATENT DOCUMENTS

| | | | |
|---|---|---|---|
| 2005/0004723 A1 | 1/2005 | Duggan et al. | |
| 2017/0032402 A1 | 2/2017 | Patsiokas et al. | |
| 2017/0072967 A1* | 3/2017 | Fendt | B60W 10/18 |
| 2019/0003862 A1* | 1/2019 | Reed | G01S 13/931 |
| 2019/0143967 A1* | 5/2019 | Kuti | G05D 1/0257 |
| | | | 701/23 |
| 2019/0303686 A1* | 10/2019 | Guo | G06K 9/3241 |
| 2020/0174469 A1* | 6/2020 | Trumpore | G05D 1/0033 |
| 2020/0408557 A1* | 12/2020 | Fasola | G01C 21/32 |
| 2020/0410254 A1* | 12/2020 | Pham | G06K 9/726 |
| 2021/0048825 A1* | 2/2021 | Elvitigala | B60W 60/0023 |
| 2021/0192233 A1* | 6/2021 | Critchley | G01S 13/93 |

\* cited by examiner

CONNECTIVITY-ENABLED TRAFFIC-AWARE SUPPLEMENTAL SENSOR CONTROL FOR INFORMED DRIVING

TECHNICAL FIELD

The subject matter described herein relates to autonomous control of vehicle sensors. More particularly, the subject matter described herein relates to control of vehicle sensor operational parameters to focus the fields of view of the sensors on area(s) of a road determined to be important to safe and efficient execution of a next maneuver of the vehicle.

BACKGROUND

Modern vehicles may include numerous of sensors dedicated to covering specific portions of the vehicle environment. These sensors are increasingly sophisticated and expensive, and an increasing number of sensors is required to monitor the vehicle environment to facilitate performance of such tasks as, for example, autonomous driving. Increasing the number of sensors increases vehicle cost. In addition, in spite of their cost and number, these sensors may not cover all areas pertinent to vehicle driving activities.

SUMMARY

In one aspect of the embodiments described herein, a sensor control system for a vehicle is provided. The system includes one or more processors and a memory communicably coupled to the one or more processors. The memory stores a zone of interest determination module including computer-readable instructions that when executed by the one or more processors cause the one or more processors to determine if at least one localized zone of interest resides within a preliminary zone of interest of the vehicle, and a sensor control module including computer-readable instructions that when executed by the one or more processors cause the one or more processors to control one or more operational parameters of at least one sensor so as to, if at least one localized zone of interest resides within the preliminary zone of interest, bring at least a portion of the at least one localized zone of interest into a of field view of the at least one sensor.

In another aspect of the embodiments described herein, a non-transitory computer readable medium is provided. The non-transitory computer readable medium has stored therein instructions, that when executed by a computing system, cause the computing system to perform functions comprising determining a preliminary zone of interest of a vehicle, determining if at least one localized zone of interest resides within the preliminary zone of interest of the vehicle, and if at least one localized zone of interest resides within the preliminary zone of interest, controlling one or more operational parameters of at least one sensor so as to bring at least a portion of the localized zone of interest into a of field view of the sensor.

In yet another aspect of the embodiments described herein, a method for controlling at least one vehicle sensor is provided. The method includes steps of determining a preliminary zone of interest of the vehicle, and determining at least one localized zone of interest of the vehicle residing within the preliminary zone of interest. If the localized zone of interest can be brought into a field of view of at least one sensor of the vehicle, operation of the sensor is controlled to bring at least a portion of the localized zone of interest into a of field view of the sensor. The method also includes steps of, if the localized zone of interest cannot be brought into a field of view of at least one sensor of the vehicle, acquiring control of at least one available remote sensor which can be controlled so as to bring at least a portion of the localized zone of interest into a field of view of the remote sensor, and remotely controlling one or more operational parameters of the available remote sensor so as to bring at least a portion of the localized zone of interest into the field of view of the available remote sensor.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Embodiments described herein relate to a system designed to control sensors (especially environment sensors) of a vehicle. The system may include a zone of interest (ZOI) determination module configured to determine at least one localized zone of interest (LZOI) from onboard vehicle map information and/or from information received from outside the vehicle. A localized zone of interest may be a location along a route of the vehicle including an event (such as a collision, traffic stoppage, etc.) or a road geometry feature (on-ramp, merge, etc.) which may influence autonomous or manual driving of the vehicle. The localized zones of interest may be added to a digital map of the vehicle surroundings and route. A preliminary zone of interest (PZOI) of the vehicle may be determined based on a next maneuver of the vehicle. The next maneuver may be a lane change, acceleration/deceleration in the current lane, etc. The preliminary zone of interest may include areas around the vehicle and ahead of the vehicle which may be particularly important to performance of the next maneuver. The system may determine if one or more LZOI's reside within the PZOI. If one or more LZOI's reside within the PZOI, the system may focus supplemental vehicle sensors on the LZOI to try to obtain information on the LZOI. This information may enable the vehicle/driver to change the next maneuver or to otherwise modify operation of the vehicle to avoid or mitigate possible effects of the LZOI. The supplemental vehicle sensors are configured to enable their positions and/or orientations to be controlled by a sensor control module to facilitate focus of the sensors on the LZOI. If vehicle supplemental sensors cannot be focused on the LZOI, the system may attempt to acquire temporary control of sensors on other vehicles in view of the LZOI, so that these sensors can be focused on the LZOI to acquire the desired information.

Figure 1:
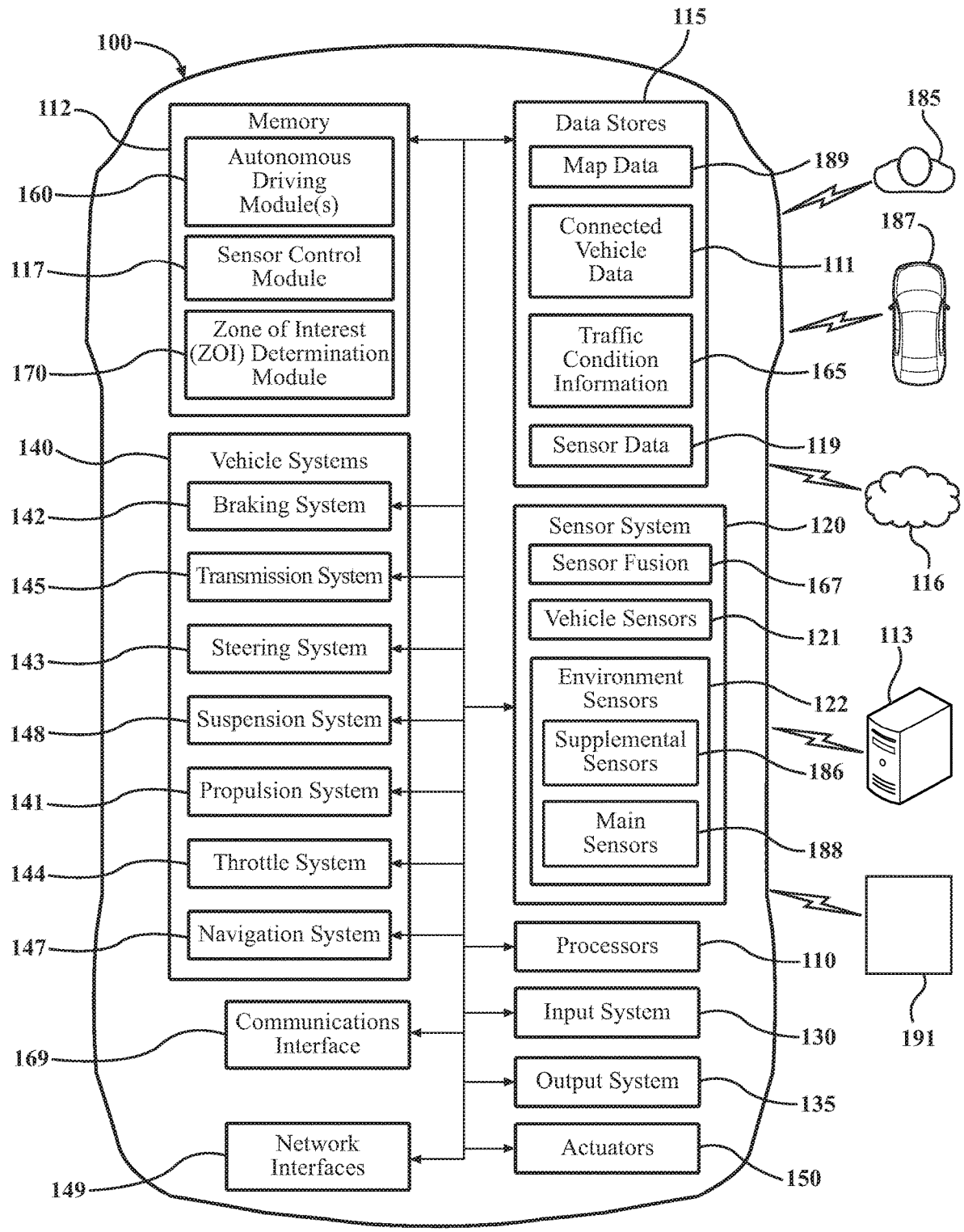
FIG. 1 illustrates a vehicle incorporating one or more supplemental sensors and a system for controlling the supplemental sensors, in accordance with embodiments described herein.

Referring to FIG. 1, an example of a vehicle 100 is illustrated. As used herein, a "vehicle" is any form of motorized transport. In one or more implementations, the vehicle 100 is conventionally-powered or hybrid passenger vehicle. While arrangements will be described herein with respect to passenger vehicles, it will be understood that embodiments are not limited to passenger vehicles. In some implementations, the vehicle 100 may be any form of motorized transport that benefits from the functionality discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100.

Some of the possible elements of the vehicle 100 are shown in FIG. 1 and will be described with reference thereto. Additionally, it will be appreciated that for simplicity and clarity of illustration, where appropriate, reference numerals may have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

FIG. 1 shows a block schematic diagram of a vehicle 100 incorporating a sensor control system in accordance with embodiments described herein. In some instances, the vehicle 100 may be configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that can operate in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one or more arrangements, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along the travel route.

The vehicle 100 can include one or more processors 110. In one or more arrangements, the processor(s) 110 can be a main processor(s) of the vehicle 100. For instance, the processor(s) 110 can be an electronic control unit (ECU). The vehicle 100 can include one or more data stores 115 for storing one or more types of data. The data store(s) 115 can include volatile and/or non-volatile memory. Examples of suitable data store(s) 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 115 can be a component of the processor(s) 110, or the data store(s) 115 can be operably connected to the processor(s) 110 for use thereby. The term "operably connected," as used throughout this description, can include direct or indirect connections, including connections without direct physical contact.

The one or more data store(s) 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more radar sensors 109 of the sensor system 120.

In one or more arrangements, the sensor data 119 can include data relating to remote sensors incorporated into one or more other vehicles and temporarily allocated by the other vehicle(s) for control by sensor control module 117 of vehicle 100, for the purposes described herein. The remote sensor data may enable and facilitate control of the remote sensors, processing of remote sensor data, and any other functions associated with remote control of the other vehicle sensors.

In one or more arrangements, the one or more data stores 115 can include map data 189. The map data 189 can include maps of one or more geographic areas. In some instances, the map data 189 can include information or data on roads, traffic control devices, road markings, structures, features of interest, and/or landmarks in the one or more geographic areas. The map data 189 can be in any suitable form. In some instances, the map data 189 can include aerial views of an area. In some instances, the map data 189 can include ground views of an area, including 360-degree ground views. The map data 189 can include measurements, dimensions, distances, and/or information for one or more items included in the map data 189 and/or relative to other items included in the map data 189. The map data 189 can include a digital map with information about road geometry. The map data 189 can be high quality and/or highly detailed. In one or more arrangements, the map data 189 may be updated continuously (i.e., as soon as information relating to revisions becomes available) or regularly from a cloud source or other source exterior of the vehicle.

The data stores 115 may store traffic condition information 165 describing traffic conditions on the road on which the vehicle 100 is traveling. Traffic condition information 165 may include navigational coordinates of particular events or conditions (such as collisions, stoppages, construction areas, etc.), an associated descriptor or classifier describing the nature of the condition, and other pertinent information.

In one or more arrangements, the one or more data stores 115 can include connected vehicle data 111. The connected vehicle data 111 may include information regarding any vehicles currently within a certain distance of the vehicle 100 (or within a certain distance of a vehicle ahead of the vehicle 100) and which may be configured for wireless communication with the vehicle 100, for purposes described herein. The connected vehicle data may include a list of connectibly-configured vehicles with an identifier for each vehicle, any information needed for wireless communication, and other information. A connectibly-configured vehicle may be a vehicle configured for wireless communication with the vehicle 100. The list may be continuously updated as vehicles enter and leave the envelope defined by the distance from the vehicle 100. In this manner, an updated list of connectibly-configured vehicles may be maintained to help reduce the time needed to establish V2V communications if needed. The connected vehicle data 111 may be continuously updated and augmented using information received from a cloud-based source or from any other suitable source via vehicle wireless communications interface 169.

In one example, the source for updating the connected vehicle data 111 (or another entity in communication with the updating source) is in communication with connectibly-configured vehicles driving along the same portion of a road on which the vehicle 100 is driving. Thus, the updating source may continuously maintain a list of connectibly-configured vehicles driving with one or more predetermined distances of each other. The updating source may be in communication with facilities, systems, and other entities configured to facilitate and/or maintain V2V and V2X communications between the vehicle 100 and other vehicles, pedestrians, servers, cloud entities, etc.

A memory 112 may store an autonomous driving module 160, a zone of interest (ZOI) determination module 170, and a sensor control module 117. The memory 112 is a random-access memory (RAM), read-only memory (ROM), a hard-disk drive, a flash memory, or other suitable memory for storing the modules 160, 170, and 117. The modules 160, 170, and 117 are, for example, computer-readable instructions that when executed by the processor(s) 110, cause the processor(s) 110 to perform the various functions disclosed herein.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process. In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operably connected to the processor(s) 110, the data store(s) 115, and/or another element of the vehicle 100 (including any of the elements shown in FIG. 1).

The sensor system 120 can include any suitable type of sensor. Various examples of different types of sensors will be described herein. However, it will be understood that the embodiments are not limited to the particular sensors described. Various examples of sensors of the sensor system 120 are described herein. The example sensors may be part of the one or more environment sensors 122 and/or the one or more vehicle sensors 121. However, it will be understood that the embodiments are not limited to the particular sensors described. The sensor system 120 may include any sensors suitable for and/or required to perform any of the data acquisition and/or vehicle control operations contemplated herein.

Sensors of sensor system 120 may be communicably coupled to the various systems and components of the vehicle 100. The sensors may be operably connected to the vehicle wireless communications interface 169 for transmission of information to a cloud or other storage facility or for vehicle-to-vehicle (V2V) or vehicle-to-everything (V2X) communications. The sensors may also be operably connected to other vehicle systems and components, such as data stores 115 and processor(s) 110, for storage and processing of vehicle and environmental sensor data. Sensor system 120 may include sensors configured to detect the current state or status of vehicle systems and components and to generate indications (for example, using trouble codes) possible malfunctions of vehicle systems and components.

The sensor system 120 can include one or more vehicle sensors 121. The vehicle sensor(s) 121 can detect, determine, and/or sense information about the vehicle 100 itself and/or any occupants inside the vehicle. The vehicle sensor(s) 121 may include sensors configured to detect conditions and/or events inside the vehicle interior or occupant compartment. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100, such as the current geographical location of the vehicle. In one or more arrangements, the vehicle sensor(s) 121 can include a speedometer to determine a current speed and acceleration/deceleration of the vehicle 100. The vehicle sensor(s) 121 may include vehicle directional sensors (not shown) configured to determine a current heading of the vehicle or direction in which the vehicle is pointed. The vehicle sensor(s) 121 may include sensors configured to sense aspects of the vehicle mechanical and electrical components and/or systems, to aid in determining a mechanical condition of the vehicle and existing and/or potential problems with the vehicle.

The sensor system 120 can include one or more environment sensors 122 configured to acquire data of at least a portion of the external environment of the vehicle 100 (e.g., nearby objects). The sensors may detect data or information about the external environment in which the vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, weather conditions, other vehicles, etc. As an example, in one or more arrangements, the environment sensors 122 can include one or more radar sensors, one or more LIDAR sensors, one or more sonar sensors, one or more cameras (not shown), and/or other types of sensors. Environment sensors 122 may be configured to detect aspects of road geometry, traffic conditions, movements and characteristics of other vehicles, and other external events and conditions occurring in the vicinity of the vehicle 100 and within the fields of view of the sensors.

The environment sensors 122 may include one or more main sensors 188 and one or more supplemental sensors 186. Main sensors 188 may be sensors dedicated to monitoring the road and a volume of space ahead of the vehicle 100, on a current path of the vehicle and for normal driving purposes. In one or more arrangements, the main sensors 188 may be positioned along a front of the vehicle or otherwise so as to enable the fields of view (FOV) of the sensors to cover a frontal arc of the vehicle. The particular types of sensors used as main sensors may be chosen depending on the type of vehicle. In one or more particular arrangements, examples of main sensors 188 may include any or all of long-range and short-range radar sensors, RGB camera(s), IR camera(s), LIDAR sensor(s), and ultrasonic sensor(s).

The main sensors 188 may be selected and positioned so as to provide complementary and/or overlapping ranges, horizontal and/or vertical fields of view (FoV), etc. The main sensors 188 may be fixedly mounted so that the positions of the sensors with respect to the remainder of the vehicle 100 may not be varied. However, the fixedly mounted sensors may be configured to be rotatable to enable adjustment of the pitch, yaw, and/or roll of the sensors to change their orientations. The autonomous driving module(s) 160 and/or the sensor control module 117 may be configured to dynamically control these operational parameters of the main sensors 188 responsive to driving conditions.

In one or more arrangements, aspects of the main sensors 188 are controlled by the sensor control module 117, but the main sensors 188 may not be configured for control by the sensor control module 117 so as to focus or redirect the fields of view of the main sensors 188 on a localized zone of interest as described herein. Rather, the main sensors 188 are mainly directed to acquiring information ahead of the vehicle 100, for normal driving purposes. In one exemplary main sensor configuration for the vehicle 100, the main sensors 188 may include a LIDAR sensor having a range of at least 120 meters, and a monocular camera having a field of view of 120°, both sensors being configured to scan in front of the vehicle in a direction of travel of the vehicle. In another exemplary main sensor configuration for the vehicle 100, the main sensors 188 may include a LIDAR sensor having a range of at least 120 meters and a field of view of 45°, and another LIDAR sensor having a range of at least 240 meters and a field of view of 22.5°. In yet another exemplary main sensor configuration for the vehicle 100, the main sensors 188 may include a LIDAR sensor having a range of at least 120 meters, and a radar sensor.

The supplemental sensors 186 may be positioned and configured to be individually and independently adjustable by control commands from the sensor control module 117. The sensor control module 117 may include computer-readable instructions that when executed by the processor(s) cause the processor(s) to control one or more operational parameters of at least one of the supplemental sensors 186 so as to bring at least a portion of a localized zone of interest (LZOI) into a of field view of the at least one supplemental sensor. The localized zone of interest may be a location on a path of the vehicle 100 containing an event (such as a collision), a potential obstacle, or any other condition which may affect performance of the vehicle next maneuver. Thus, as the supplemental sensors 186 are to be focused on localized zones of interest, these sensors may not be employed on a constant basis as the main sensors 188 are to facilitate normal driving operation. Rather, use of the supplemental sensors 186 may be situational depending on the presence of a feature along the projected vehicle path which may affect performance of the vehicle next maneuver.

In some arrangements, one or more localized zones of interest may be centered on areas where the road geometry or structure may interfere with or otherwise affect performance of a maneuver. One or more localized zones of interest (LZOI) may also be centered on locations of unusual, disruptive, or dangerous traffic conditions (such as an accident). Thus, the supplemental sensors 186 may be continuously and dynamically adjustable responsive to such factors as road geometry or structure and traffic conditions, to support maneuvers of the vehicle 100 during driving.

A maneuver of the vehicle 100 supported by the supplemental sensors 186 may be a next maneuver of the vehicle 100 as determined by the autonomous driving module(s) 160 during autonomous driving of the vehicle 100 along a route determined by the navigation system 147. The next maneuver may also be determined or estimated from actions of a human driver. The supplemental sensors 186 may be directed to supporting safe and efficient execution of the next maneuver of the vehicle 100 by acquiring data which affects (or may affect) performance of the vehicle maneuver.

In one or more arrangements, the supplemental sensors 186 may be selected and positioned so as to provide complementary and/or overlapping ranges, horizontal and/or vertical fields of view (FoV), etc. The supplemental sensors 186 may be fixedly mounted so that the positions of the sensors with respect to the remainder of the vehicle 100 may not be varied. Alternatively, the supplemental sensors 186 may be movably mounted to the vehicle so that the positions of the sensors 186 with respect to the remainder of the vehicle 100 (or with respect to a fixed reference feature on the vehicle 100, such as the steering wheel) may be varied by control commands generated by the sensor control module 117. For example, one or more of the supplemental sensors 186 may be mounted on rails or guides so as to be movable by motors, chain or belt drives, and/or other methods. In addition, whether fixedly or movably mounted, the supplemental sensors 186 may be configured to enable adjustment of the pitch, yaw, and/or roll of the sensors to change their orientations. The sensor control module 117 may be configured to dynamically control these operational parameters of the supplemental sensors 186 responsive to conditions detected in localized zones of interest, in a manner described herein. The supplemental sensors 186 may be independently controllable by the sensor control module 117 so as to focus or redirect the field of view of each individual supplemental sensor 186 on a localized zone of interest as described herein. In some arrangements, supplemental sensors 186 may be mounted along the front, sides, and/or rear of the vehicle, depending on such factors as vehicle type, user preference, intended vehicle use, and other factors. In particular embodiments, the supplemental sensors 186 are mounted along the rear and one or more sides of the vehicle. In certain arrangements, one or more of supplemental sensors 186 may be configured as modules attachable to desired portions of a vehicle and configurable to add supplemental sensor capability on a vehicle not including such capability in its original equipment.

Figure 2:
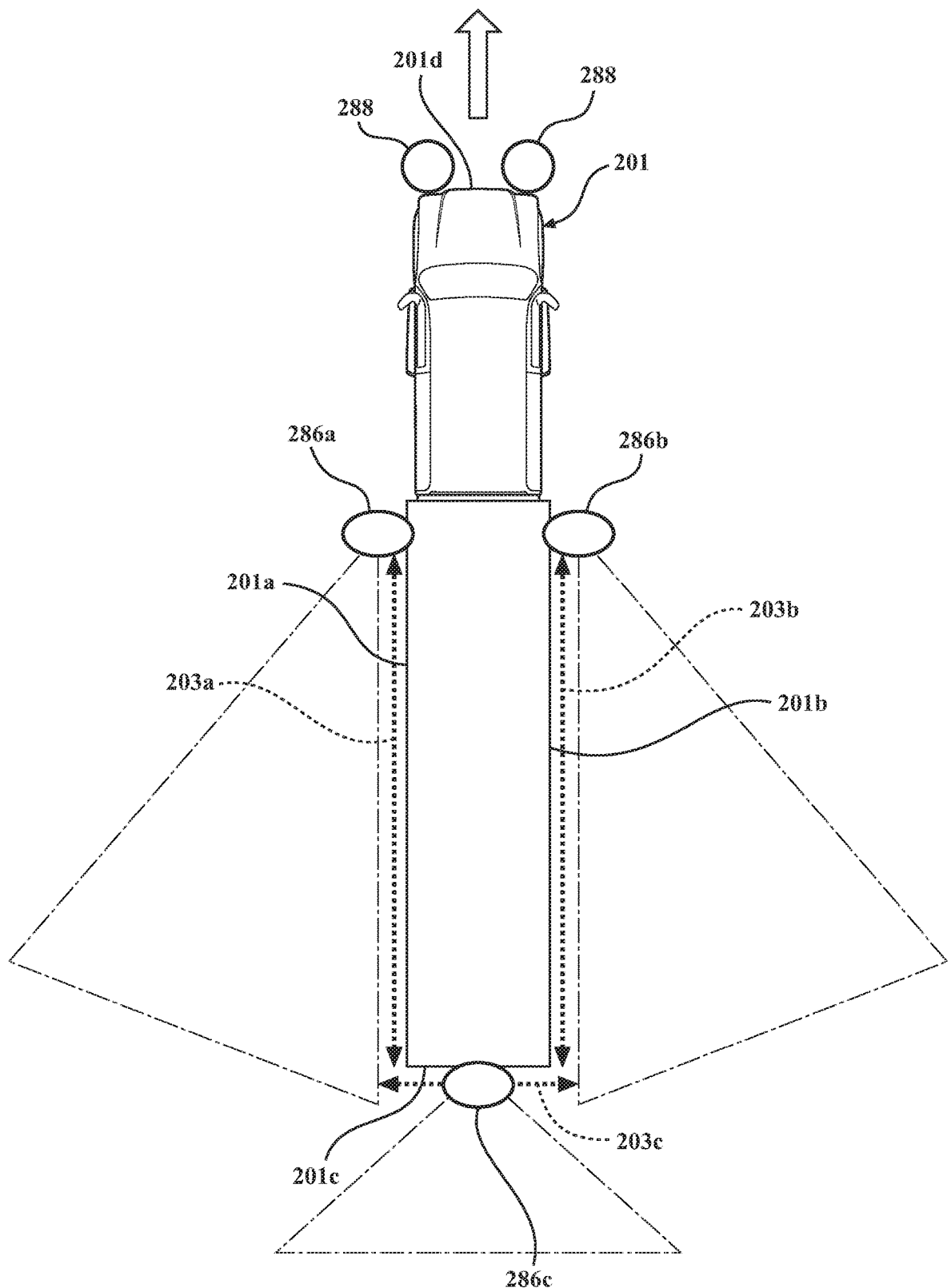
FIG. 2 is a schematic plan view of an exemplary sensor arrangement mounted on a vehicle in accordance with an embodiment described herein.

FIG. 2 shows a schematic plan view of an exemplary supplemental sensor arrangement on a vehicle. The vehicle 201 is in the form of a semi-trailer truck. Referring to FIG. 2, in one or more arrangements, supplemental sensors 286*a*, 286*b*, 286*c* may be movably mounted along respective sides 201*a*, 201*b* of the vehicle 201 and along the rear 201*c* of the vehicle. FIG. 2 shows main sensors 288 mounted along the front 201*d* of the vehicle 201 to focus on forward driving arcs. In some embodiments, the supplemental sensors 286*a*, 286*b*, 286*c* may be mounted on respective rails 203*a*, 203*b*, 203*c* or otherwise repositionably mounted, so that the positions of the supplemental sensors 286 may be adjusted along the length and/or width of the vehicle 201. The mountings may be motorized and controlled by chain drives or other motion arrangements, to reposition the sensors 286 with respect to the remainder of the vehicle 201 responsive to control commands from the sensor control module 117. Thus, for example, the sensors 286*a*, 286*b* may be movable longitudinally along respective sides 201*a*, 201*b* of the vehicle 201 and the sensor 286*c* may be movable laterally along the rear end 201*c* of the vehicle. The supplemental sensors 286 may also be mounted so as to enable the sensor orientation (i.e., yaw, pitch, roll) to be dynamically and autonomously adjusted to aid in bringing features of interest into the sensors' field of view. The operational parameters (yaw, pitch, roll, position with respect to the remainder of the vehicle, and also other parameters which may be particular to individual sensors) of the supplemental sensors 286 may be controlled as described herein by a sensor control module 117.

By providing the vehicle with supplemental sensors having dynamically directable fields of view and which are dynamically movable and/or repositionable with respect to the remainder of the vehicle, the supplemental sensors can be tasked as needed to focus on areas particularly pertinent to performance of a next vehicle maneuver.

Referring again to FIG. 1, a sensor fusion algorithm 167 may be an algorithm (or a computing device storing an algorithm) configured to accept data from the sensor system 120 as an input. The data may include, for example, data representing information sensed at the sensors of the sensor system 120. The sensor fusion algorithm 167 may include or be configured to be executed using, for instance, a Kalman filter, Bayesian network, or other algorithm. The sensor fusion algorithm 167 may provide various assessments based on the data from sensor system 120. Depending upon the embodiment, the assessments may include evaluations of individual objects and/or features in the environment of vehicle 100, evaluations of particular situations, and/or evaluations of possible impacts based on the particular situation. Other assessments are possible.

The vehicle wireless communications interface 169 may be configured to enable and/or facilitate communication between the components and systems of the vehicle and entities (such as cloud facilities, cellular and other mobile communications devices, other vehicles, remote servers, pedestrians, etc.) exterior of the vehicle. Wireless communications interface 169 may be configured to facilitate, establish, maintain, and end wireless V2V and V2X communications with any extra-vehicular entity, for example other connectibly-configured vehicles and connected vehicles 187, pedestrians 185, servers and entities located in the cloud 116, edge servers 113, and other information sources and entities 191. Information such as sensor data, traffic information, road condition information, weather information, information regarding events or conditions in a zone of interest to the vehicle 100 and other types of information may be transmitted and received. If required, wireless communications interface 169 may incorporate or be in communication with any network interfaces 149 needed to communicate with any extra-vehicular entities and/or networks.

The vehicle 100 can include an input system 130. An "input system" includes any device, component, system, element or arrangement or groups thereof that enable information/data to be entered into a machine. For example, the input system 130 may include a keypad, a touch screen or other interactive display, a voice-recognition system and/or any other device or system which facilitates communications between a user and the vehicle. The input system 130 can receive an input from a vehicle occupant (e.g., a driver or a passenger) or a user located remotely from the vehicle 100.

The vehicle 100 can also include an output system 135. An "output system" includes any device, component, or arrangement or groups thereof that enable information/data to be presented to a vehicle occupant (e.g., a driver, a vehicle passenger, etc.) or a remote user.

The vehicle 100 can include one or more vehicle systems, collectively designated 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle systems 140 can include a propulsion system 141, a braking system 142, a steering system 143, throttle system 144, a suspension system 148, a transmission system 145, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system. The navigation system 147 may be configured to track the path of a vehicle along a travel route. The navigation system 147 may be configured to operate in conjunction with the autonomous driving module to guide the vehicle along a travel route selected by a user.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110, the autonomous driving module(s) 160, the zone of interest determination module 170, and/or the sensor control module 117. Any suitable actuators can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by processor(s) 110, implement one or more of the various processes described herein. One or more of the modules can be a component of the processor(s) 110, or one or more of the modules can be executed on and/or distributed among other processing systems to which the processor(s) 110 is operably connected. The modules can include instructions (e.g., program logic) executable by one or more processor(s) 110. Alternatively, or in addition, one or more of data store(s) 115 or another portion of the vehicle 100 may contain such instructions.

Generally, a module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc. The autonomous driving module(s) 160 can be configured to receive and/or determine location information for obstacles within the external environment of the vehicle 100 for use by the processor(s) 110 and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 can be configured to determine travel path(s), current autonomous driving maneuvers for the vehicle 100, future autonomous driving maneuvers and/or modifications to current autonomous driving maneuvers based on data acquired by the sensor system 120 and/or information received from a navigation system, such as navigation system 147. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, force, compel, direct, command, instruct, and/or enable an event or action to occur or at least be in a state where such event or action may occur, either in a direct or indirect manner.

The autonomous driving module(s) 160 can be configured to execute various vehicle functions and/or to transmit data to, receive data from, interact with, and/or control the vehicle 100 or one or more systems thereof (e.g., one or more of vehicle systems 140). The autonomous driving module(s) 160 may be configured to autonomously control the user vehicle 100 so as to drive the vehicle along a travel route, from an initial or start location to a destination.

The processor(s) 110, the sensor control module 117, the autonomous driving module(s) 160 and other modules can be operably connected to communicate with each other and with the other elements of the vehicle, including various vehicle systems 140 and/or individual components thereof. For example, returning to FIG. 1, the processor(s) 110, the sensor control module 117 and/or the autonomous driving module(s) 160 can be in communication to send and/or receive information from the various vehicle systems 140 to control the movement, speed, maneuvering, heading, direction, etc. of the vehicle 100. The processor(s) 110, the sensor control module 117 and/or the autonomous driving module(s) 160 may control some or all of these vehicle systems 140 and, thus, may be partially or fully autonomous.

The processor(s) 110, the sensor control module 117, the autonomous driving module(s) 160 and other modules may be operable to control the navigation and/or maneuvering of the vehicle 100 by controlling one or more of the vehicle systems 140 and/or components thereof. For instance, when operating in an autonomous mode, the processor(s) 110 and/or the autonomous driving module(s) 160 can control the direction and/or speed of the vehicle 100. The processor(s) and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels).

The memory 112 may store a zone of interest (ZOI) determination module 170. The ZOI determination module 170 may include computer-readable instructions that when executed by the one or more processors cause the one or more processors to (either alone or in conjunction with the navigation system 147) generate a dynamically populatable/depopulatable digital map based on a location of the vehicle 100. The digital map may be used to guide operational control of the supplemental sensors 186 as described herein. The digital map may include any geographical, structural, and other characteristics of the route, including features of interest which may be found in the map data 189 and in other information either residing on the vehicle 100 or received by the vehicle from external sources such as cloud sources 116, external or edge servers 113, connected vehicles 187, etc. For purposes of controlling the vehicle supplemental sensors 186 as described herein, a "feature of interest" may be any characteristic of the current route that may affect the driving of the route by the vehicle 100. Non-exclusive examples of features of interest include road geometry characteristics (on-ramps, merges, off-ramps, etc.), traffic events (congestion, accidents, etc.), and/or any other occurrences or conditions residing along the current or projected route of the vehicle 100.

In one or more arrangements, the digital map may cover a predetermined distance ahead of the vehicle 100 and areas to the sides of the vehicle, on the road on which the vehicle 100 is currently travelling. Map coverage may extend to (or to a predetermined distance past) the shoulders of the road. In some embodiments, the road may be part of a current route of the vehicle as planned by the navigation system. In some embodiments, the road may simply be a road the vehicle 100 is currently traveling on.

The details of the digital map may change as the vehicle position changes on the route, as the vehicle executes various maneuvers, as new events occur on the route, and according to other factors. Thus, the digital map moves with the vehicle along the route and the map contents dynamically change to reflect the current location of the vehicle 100 and its surroundings. As described herein, features of interest may be assigned to the digital map as localized zones of interest (LZOI's) and flagged according to their navigational coordinates, type of feature, and other characteristics. Thus, the digital map may be populated with any LZOI's determined from received information and continuously updated. The digital map may also include the PZOI for the next vehicle maneuver, as described herein.

The ZOI determination module 170 may receive a constant flow of information relating to conditions along (and characteristics of) the current route of the vehicle 100. This information may include information relating to features of interest as described above. The flow of information is "constant" in that it is transmitted to the vehicle 100 and relayed to the ZOI determination module as soon as possible after the information becomes known or available. The received information may be traffic information, road geometry information, and/or other types of information pertinent to the travel a route on which the vehicle 100 is traveling. The information may come from ego-vehicle sensors, connected vehicles, road maps and map data stored on the vehicle or on cloud sources and/or other outside sources. This information may be received and processed as continuously as possible so that it is up-to-date and can be reacted upon as soon as possible by the systems of the vehicle 100. The received condition/feature information may be stored in a buffer (such as traffic condition information 165, for example) if needed for further processing by the ZOI determination module and/or other vehicle systems. The received information may be used to update the digital map and to assign LZOI's to the digital map.

The ZOI determination module 170 may include computer-readable instructions that when executed by the one or more processors 110 cause the one or more processors to assign the locations of features of interest to the digital map as localized zones of interest (LZOI). An LZOI may be a particular location or set of coordinates on the digital map containing a feature of interest (i.e., a physical object, an aspect of road geometry (on-ramp, off-ramp, fork, lane closure, etc.), and/or an event (collision, traffic stoppage, etc.)) which may affect driving of the vehicle 100 along a route. Any LZOI is a potential focus area for the fields of view of the supplemental sensors 186 as described herein. That is, based on an inability of main sensors 188 to bring the LZOI into fields of view of the main sensors 188 and other factors, one or more of the supplemental sensors 186 may be controlled so as to bring the LZOI into their field(s) of view. Collection of information relating to features of interest and assignment of features of interest to the digital map as LZOI's can be done continuously to the greatest degree possible, so that the digital map may always be up-to-date. This may aid in reducing vehicle reaction time to rapidly changing road conditions and events.

The ZOI determination module 170 may also determine a preliminary ZOI (PZOI) of the vehicle 100. A preliminary ZOI of the vehicle 100 may be a contiguous region including a space around the immediate vicinity of the vehicle (out to a predetermined distance from the vehicle), ahead of the vehicle 100 and/or to the sides of the vehicle. In one or more arrangements, this region of space may be defined based on its significance to the performance of a specific determined or estimated next maneuver of the vehicle 100. That is, it may be beneficial to determine events, road conditions, road geometry characteristics, etc. occurring within a PZOI comprising certain areas adjacent the current position of the vehicle 100 and also in the path of the vehicle, to help ensure safe and efficient performance of the next vehicle maneuver. Examples of a next vehicle maneuver may include slowing down, a lane change, stopping, pulling over to a road shoulder, a turn, or exiting the road on an upcoming exit ramp.

Figure 5:
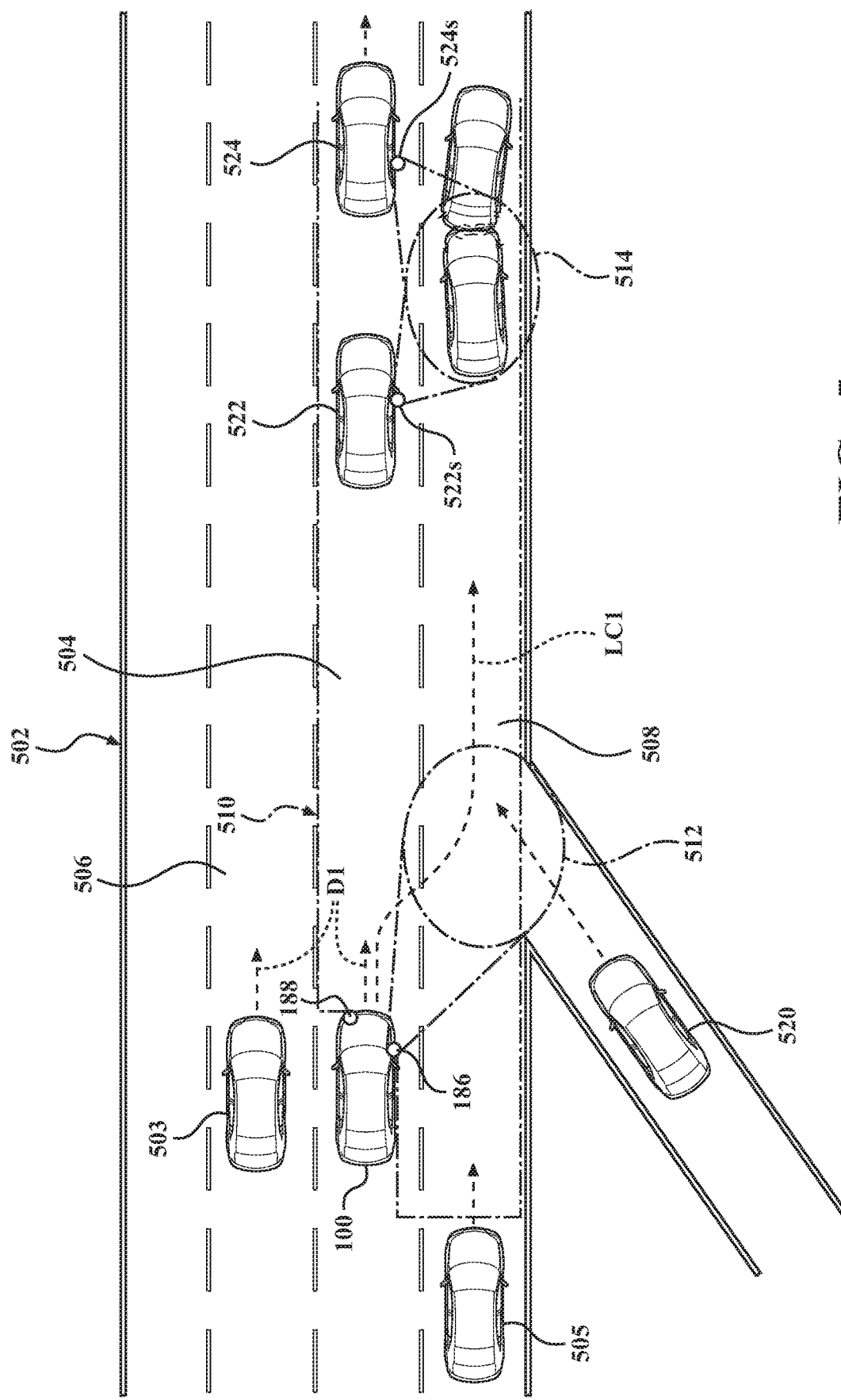
FIG. 5 is a schematic plan view of a section of road illustrating operation of a vehicle in determining zones of interest and controlling remote sensors to monitor the zones of interest.

The PZOI may be located and dimensioned with respect to the vehicle 100 and may move along the digital map in conjunction with the vehicle 100 until the next vehicle maneuver has been completed, discontinued, or replaced with another next maneuver. The PZOI may extend to any desired distance ahead of the vehicle along its current path. The boundaries of the PZOI may depend on the nature of the next vehicle maneuver. For example, FIG. 5 shows one possible PZOI 510 of a vehicle 100 defined for a right-hand lane change maneuver of the vehicle 100. In the example shown, the PZOI 510 for this maneuver may encompass basically the space along the right side of the road (including the right-hand road shoulder), everything ahead of the vehicle 100 in the same lane 504 and in the lane(s) to the right, and along the right side of the vehicle 100 adjacent the vehicle and behind the vehicle a predetermined distance (to allow environment sensors 122 to scan for other vehicles moving up along the right side of the vehicle 100). In another example, if the vehicle 100 is driving in a right-most lane of a road and the predicted next vehicle maneuver is an exit onto an upcoming off-ramp, the PZOI may be defined as everything ahead of the vehicle in the same lane and in the adjacent lane to the left and a predetermined distance behind the vehicle (to allow environment sensors 122 to scan for other vehicles moving up along the left side of the vehicle). This PZOI may be bounded on the right side by the road shoulder. Other examples of next vehicle maneuvers may include a turn, a vehicle stop, traveling ahead on the same road for the next 10 miles, etc. The next maneuver can be based on a projected path of the vehicle toward a destination as determined by a navigation system. The next maneuver may change during driving due to local conditions.

The PZOI may be determined by the ZOI determination module based on the vehicle next maneuver, after the next maneuver is received by the ZOI determination module. If desired, a default PZOI may be pre-defined for each of a variety of next vehicle maneuvers and according to the road geometry in the vicinity of the vehicle at the time the next maneuver is received by the ZOI determination module 170.

In autonomous and semi-autonomous vehicles, the next vehicle maneuver may be determined by the navigation system 147 or by the autonomous driving module(s) 160 in conjunction with the navigation system as part of a determined travel route. Alternatively, the next vehicle maneuver may be determined by the actions of a human driver and/or may be detected or predicted based on actions of the human driver. The ZOI determination module 170 may include computer-readable instructions that when executed by the processor(s) 110 cause the processor(s) to interpret and/or predict the next vehicle maneuver to be performed by a human driver based on received vehicle and/or environment sensor information. For example, vehicle sensors 121 may detect the activation of a right-hand turn signal by a human driver when the vehicle 100 is traveling straight along a highway at 50 MPH. Based on this action and/or other information, the ZOI determination module 170 (or another module) may determine that the next vehicle maneuver is a right-hand lane change. Based on the determination or prediction of the next maneuver, the ZOI determination module 170 may determine an associated PZOI.

In the manner described herein, the PZOI is an area in which to focus a search for LZOI's which may affect driving of the vehicle 100. Using the known boundaries of the PZOI, the ZOI determination module 170 may also determine if locations of any of the LZOI's on the digital map reside within the PZOI for the next vehicle maneuver. If any locations of the LZOI's do not reside within the PZOI for the next vehicle maneuver, the module 170 may ignore the LZOI. However, if a location of a single LZOI resides within the PZOI, the ZOI determination module 170 may designate this LZOI to be a main LZOI. In one or more arrangements, for purposes of locating an LZOI for sensor control, the LZOI may be defined as centered on a set of navigational or positional coordinates and encompassing a predetermined area or radius about the coordinates.

The digital map may be dynamically updated as the vehicle moves. For example, as the vehicle/digital map boundaries move along a road or travel route, new road geometry features such as exit-ramps, on-ramps, and merges may appear on the digital map, and an LZOI along a previous portion of the route may be removed from the digital map after the vehicle 100 has moved on to the point where such features no longer reside within the PZOI. Similarly, conditions such as traffic accidents and traffic congestion appearing as an LZOI along the previous portion of the route may be removed from the map after the vehicle has moved on to the point where such conditions no longer reside within the PZOI.

The ZOI determination module 170 may include computer-readable instructions that when executed by the one or more processors cause the one or more processors to, if two or more LZOI's are determined to reside within the PZOI, prioritize the LZOI's. In some embodiments, prioritization may be based on a shortest distance between the vehicle 100 and an LZOI located in or along the current path of the vehicle. The minimum-distance LZOI may be first priority because the vehicle may be affected by this LZOI before it is affected by other LZOI's. A next closest LZOI may be assigned second priority, etc. The first-priority (or main) LZOI may have top priority regarding the focusing of one or more supplemental sensors 186, if the main LZOI is not within a field of view of the vehicle main sensors 188.

The memory 112 may also store a sensor control module 117. The sensor control module 117 may include computer-readable instructions that when executed by the one or more processors cause the one or more processors to determine if at least a portion of the main LZOI is within a field of view of at least one of supplemental sensor(s) 186. If at least a portion of the main LZOI is within a field of view of at least one supplemental sensor, the sensor control module 117 may control the at least one supplemental sensor to gather data relating to the main LZOI. If at least a portion of the main LZOI is not within a field of view of at least one supplemental sensor, the sensor control module 117 may determine if at least one supplemental sensor of the vehicle 100 may be controlled so as to bring at least a portion of the main LZOI into a field of view of the supplemental sensor. This determination may be made using the operating specifications of the supplemental sensors 186, a known location of the LZOI in relation to the current location of the vehicle 100, the possible scope of the field of view of each supplemental sensor given the way the sensor is mounted to the vehicle and the ways the sensor parameters may be adjusted, and other pertinent factors.

The sensor control module 117 may also be configured to, if at least one supplemental sensor of the vehicle 100 may be controlled so as to bring at least a portion of the main LZOI into a field of view of the supplemental sensor, control one or more operational parameters of the supplemental sensor so as to bring at least a portion of the main LZOI into a field view of the supplemental sensor. The module 117 may control sensor position, orientation (yaw, pitch, roll, etc.) and other operational parameters of the supplemental sensor(s). In one or more arrangements, the entire LZOI may be brought into the field of view of at least one sensor. In one or more arrangements, the entire LZOI may be brought into the field of view of each sensor of multiple sensors. In one or more arrangements, at least a pair of the supplemental sensors 186 may be controlled so as to have overlapping fields of view when directed toward the LZOI, so that the entire LZOI is within the combined overlapping fields of view of the pair of sensors.

After operational parameters of at least one supplemental sensor have been controlled so as to bring at least a portion of the main LZOI into a field view of the supplemental sensor, the sensor control module 117 may continuously control operational parameters of the supplemental sensor as the vehicle 100 moves so as to maintain at least a portion of the main localized zone of interest in the field of view of the supplemental sensor for as long as possible (for example, until control of the operating parameters can no longer bring at least a portion of the main LZOI into the FOV of the sensor), and until none of the supplemental sensors 186 can be controlled so as to bring at least a portion of the main LZOI into any of their respective fields of view.

The sensor control module 117 may also include computer-readable instructions that when executed by the one or more processors 110 cause the one or more processors to, if at least one supplemental sensor of the vehicle 100 may not be controlled so as to bring at least a portion of the main LZOI into a field of view of the supplemental sensor, determine if there are any connected or connectibly-configured other vehicles which have one or more sensor(s) that may be controlled so as to bring at least a portion of the main LZOI into any of their respective field(s) of view. The connected and connectibly-configured vehicles may be determined from the connected vehicle data 111. The connected vehicles may already be in communication with the vehicle 100, while communication with other connectibly-configured (but not currently connected) vehicles may be established if needed. In one or more arrangements, a list of connected vehicles within a certain distance of the vehicle 100 may be compiled and continuously maintained using information received from cloud-based or other entities, by intermittently "pinging" other vehicles in proximity of the vehicle 100 using V2V protocols and/or using other methods.

If there are any connected or connectibly-configured other vehicles which have one or more sensor(s) that may be controlled, the vehicle 100 may request to establish temporary control of one or more of these remote sensor(s) so as to bring at least a portion of the main LZOI into their field(s) of view. A "remote sensor" is a sensor mounted in a vehicle other than the vehicle 100 and which may be temporarily and conditionally controlled by the vehicle 100 to acquire information relating to a localized zone of interest. The sensor control module 117 may also be configured to continue to control the remote sensor(s) to maintain the main LZOI in the respective field(s) of view of the remote sensor(s). In this manner, the sensor control module 117 may temporarily remotely control the sensors of other, connected vehicles to obtain information relating to the main LZOI. This information may then be relayed to the vehicle 100 for route planning.

Operation a system for controlling one or more vehicle sensors in accordance with an embodiment described herein will now be discussed with reference to FIGS. 3-4B.

Figure 3:
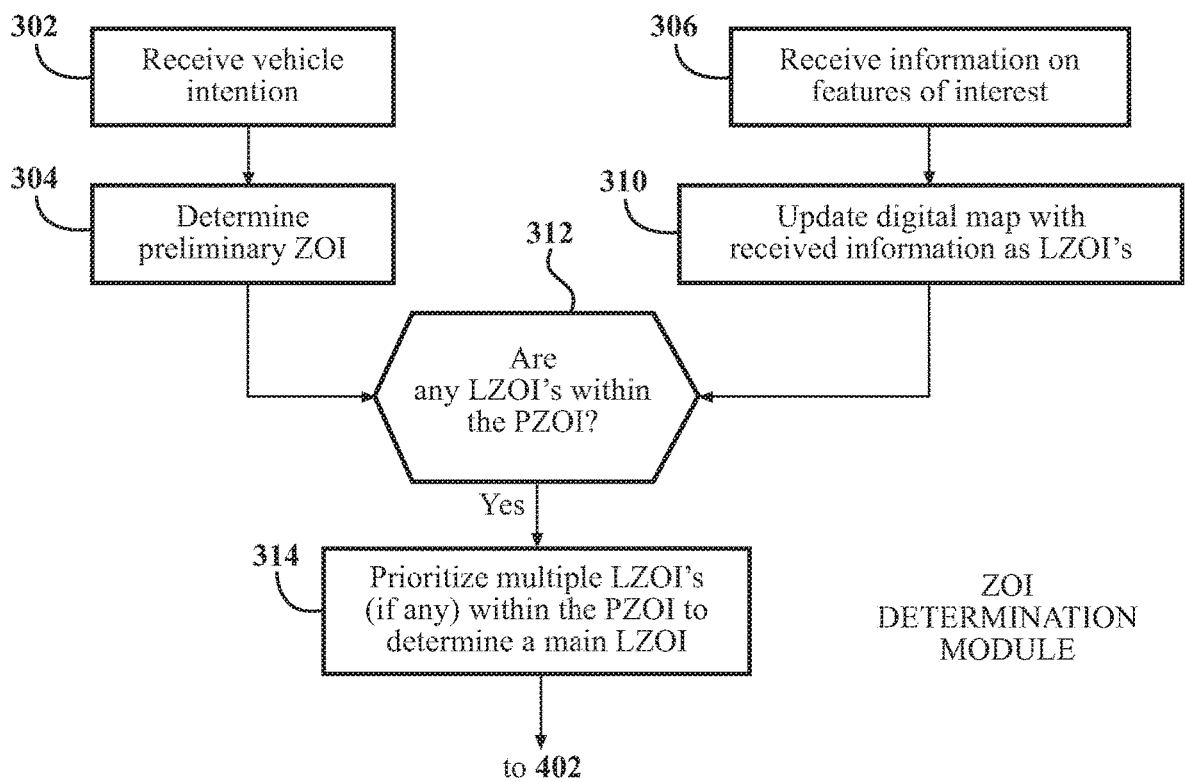
FIG. 3 is a flow diagram illustrating operation of a zone of interest determination module in accordance with an embodiment described herein
Figure 4A:
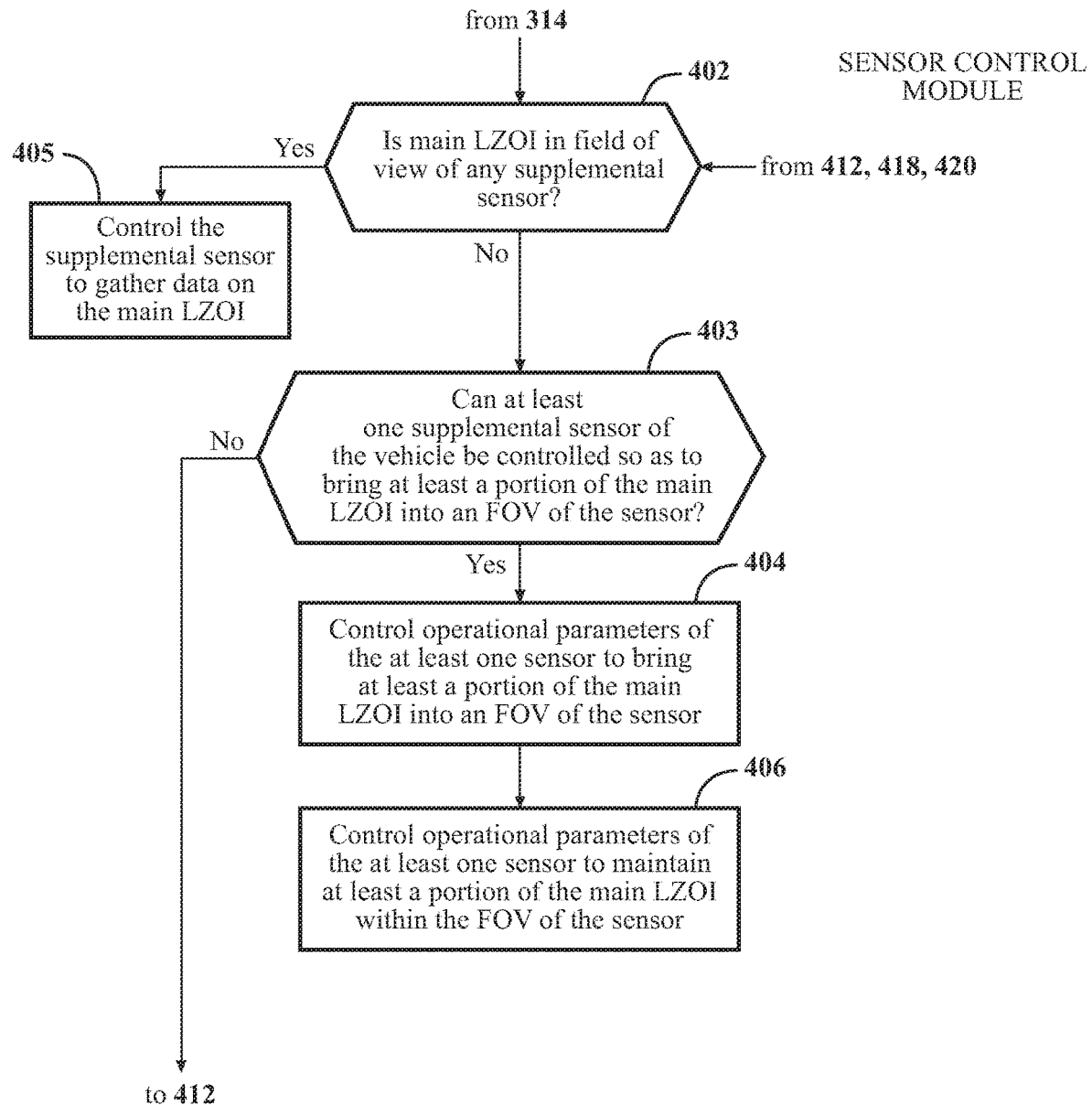
FIG. 4A is a flow diagram illustrating a portion of the operations of a sensor control module in accordance with an embodiment described herein
Figure 4B:
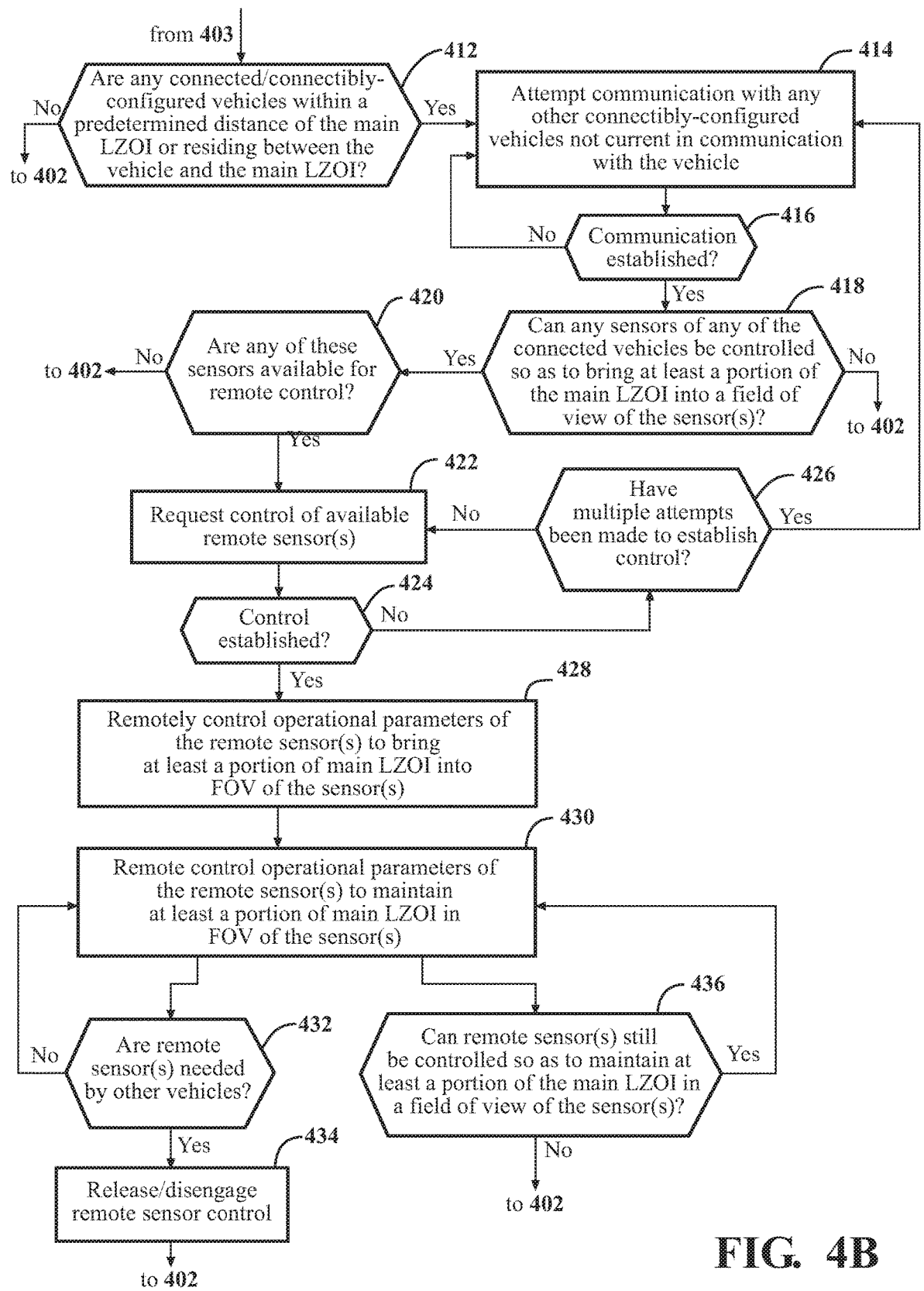
FIG. 4B is a flow diagram illustrating another portion of the operations of the sensor control module in accordance with an embodiment described herein.

Referring to FIGS. 3-4B, in block 302, the zone of interest determination module 170 may receive the intention of the vehicle 100. This may be the next maneuver of the vehicle. On an ongoing basis, prior to, during, and/or after determination of the vehicle intention, the zone of interest determination module 170 may also receive (in block 306) information on features of interest (such as traffic and road geometry) which may be added as LZOI's (in block 310) to the information already incorporated into the digital map.

In block 304, based on the vehicle intention, the zone of interest determination module 170 may determine a PZOI for the vehicle intention. In block 312, the zone of interest determination module 170 may determine if any LZOI's reside within the PZOI. If there is a single LZOI in the PZOI, the zone of interest determination module 170 may assign the single LZOI as the main LZOI. However, if there are two or more LZOI's in the PZOI, the zone of interest determination module 170 may (in block 314) prioritize the LZOI's. As previously stated, the zone of interest determination module 170 may prioritize the LZOI's based on proximity to the vehicle 100 or any other suitable criteria.

Referring to FIGS. 4A-4B, in block 402, the sensor control module 117 may determine if the main LZOI is currently in the field of view of any of supplemental sensors 186. If the main LZOI is currently in the field of view of any of supplemental sensors 186, the sensor control module 117 may (in block 405) control the supplemental sensor(s) 186 of the vehicle 100 as previously described (i.e., by controlling sensor position, pitch, roll, yaw, etc.) to gather data on the main LZOI.

Returning to block 402, if the main LZOI is not currently in the field of view of any of supplemental sensors 186, the sensor control module 117 may determine (in block 403) if at least one of supplemental sensors 186 can be controlled so as to bring at least a portion of the main LZOI into a field of view of the sensor. If at least one of supplemental sensors 186 can be controlled so as to bring at least a portion of the main LZOI into a field of view of the sensor, the sensor control module 117 may (in block 404) control operational parameters of the at least one sensor to bring at least a portion of the main LZOI into an FOV of the sensor. The sensor control module 117 may then (in block 406) control operational parameters of the at least one sensor to maintain at least a portion of the main LZOI within the FOV of the sensor.

Returning to block 403, if at least one supplemental sensor of the vehicle 100 cannot be controlled so as to bring at least a portion of the main LZOI into an FOV of the sensor(s), the sensor control module 117 may (in block 412) determine if any connected/connectibly-configured vehicles reside either within a predetermined distance of the main LZOI or between the vehicle 100 and the main LZOI. In FIG. 5, examples of such vehicles may be vehicles 522 and 524.

In block 414, if any connected/connectibly-configured vehicles reside either within a predetermined distance of the main LZOI or between the vehicle and the main LZOI, the sensor control module 117 may attempt communication with any of the connectibly-configured vehicle(s) not currently in communication with the vehicle 100. V2V communications may be established using known handshake and communication protocols. If communication is not established with at least one of the connected/connectibly-configured vehicles, the sensor control module 117 may (in block 416) retry to establish communications.

If communication is established with at least one of the connected/connectibly-configured vehicles, the sensor control module 117 may (in block 418) determine if any remote sensors of any of the connected vehicles can be controlled so as to bring at least a portion of the main LZOI into a field of view of a sensor(s). If none of the sensors of any of the connected vehicles can be controlled so as to bring at least a portion of the main LZOI into a field of view of a sensor(s), control may proceed to block 402, where the sensor control module 117 will determine if the vehicle 100 has advanced far enough along the road toward the main LZOI so that at least a portion of the main LZOI is currently within an FOV of any of supplemental sensors 186 of vehicle 100.

If at least a portion of the main LZOI is not currently within an FOV of any of supplemental sensors 186, block 403 may be repeated. If at least one supplemental sensor of the vehicle 100 cannot be controlled so as to bring at least a portion of the main LZOI into an FOV of the sensor(s), control may pass back to block 412. The loop just described may continue until a sensor is found (either on the vehicle 100 or a connected vehicle) which either currently has the main LZOI in the field of view of the sensor, or can be controlled so as to bring at least a portion of the main LZOI into its field of view.

Returning to block 418, after at least one suitable sensor has been found on a connected vehicle, the sensor control module 117 may (in block 420) determine if any of the sensors which can be controlled so as to bring at least a portion of the main LZOI into a field of view of the sensor(s) are available for remote control by the vehicle 100. If none of these sensors are currently available, control may return to block 402. However, if sensors are available for remote control, the sensor control module 117 may (in block 422) request/establish control of the available remote sensor(s).

If control is not established (block 424) and multiple attempts at communication have failed (block 426), control may pass back to block 414. For example, the sensor control module 117 may make 3 attempts to acquire control of the available remote sensors. However, if control of the remote sensor(s) is established, the sensor control module 117 may (in block 428) remotely control operational parameters of the remote sensor(s) to bring at least a portion of the main LZOI into the FOV's of the sensor(s). The sensor data gathered by the remotely controlled remote sensors may then be transmitted to the vehicle 100, where the data may be used to vary the next maneuver or a route of the vehicle 100 if advisable. The sensor control module 117 may then (in block 430) remotely control operational parameters of the remote sensor(s) to maintain at least a portion of main LZOI in FOV of the sensor(s).

The operational parameters of the other vehicle remote sensor(s) may be controlled to maintain at least a portion of main LZOI in FOV of the sensor(s) until either an alert is received (in block 432) from a connected vehicle whose sensor(s) are being remotely controlled, stating that the connected vehicle requires use of the sensor(s) currently being controlled by the vehicle 100, or (block 436) the remote sensor(s) can no longer be controlled so as to maintain at least a portion of the main LZOI in a field of view of the sensor(s). If the connected vehicle requires use of the sensor(s) currently being controlled by the vehicle 100, the sensor control module 117 may (in block 434) release/disengage remote control of the remote sensor(s). Control may then pass back to block 402 to see if a supplemental sensor 186 of the vehicle 100 can acquire data on the main LZOI. Also, if the remote sensor(s) can no longer be controlled so as to maintain at least a portion of the main LZOI in a field of view of the sensor(s) (block 436), remote control of the sensor(s) may disengage and pass back to block 402.

FIG. 5 is a schematic plan view of a section of road 502 showing possible scenarios in which a sensor control system in accordance with an embodiment described herein may operate, in the manner shown in FIGS. 3-4B. The vehicle 100 is shown moving in a lane 504 in direction D1. Another vehicle 503 moves in direction D1 in a left adjacent lane 506, and yet another vehicle 505 moves in direction D1 in a right adjacent lane 508. The next maneuver of the vehicle 100 may be a right-hand lane change (indicated by arrow LC1). Based on this next maneuver, a PZOI for the next maneuver may be determined as previously described and is shown in phantom as 510. The zone of interest determination module 170 may have previously identified LZOI's 512 and 514 on the digital map including the section of road shown.

Based on the PZOI 510 shown, the zone of interest determination module 170 may determine that LZOI 512 (the location of an on-ramp) and LZOI 514 (a location of a traffic accident) reside within the PZOI 510. Since multiple LZOI's 512 and 514 reside within the PZOI 510, the zone of interest determination module 170 may prioritize the LZOI's according to proximity to the vehicle 100. Based on proximity to vehicle 100, LZOI 512 may be prioritized as the main LZOI, and LZOI 514 may be prioritized as a second LZOI. Since front-mounted vehicle main sensors 188 may not be able to gather data on the main LZOI 512, the sensor control module 117 may control vehicle side-mounted supplemental sensor(s) 186 to direct their fields of view toward the main LZOI 512 and maintain the fields of view on the main LZOI 512 until the vehicle 100 has passed the on-ramp. When focused on the LZOI 512, the supplemental sensors 186 may detect another vehicle 520 entering the road 502 via the on-ramp. This may enable the next vehicle maneuver or the route plan to be adjusted to avoid the other vehicle 520.

As the vehicle 100 proceeds farther in direction D1, the LZOI 514 containing the traffic accident may become the new main LZOI. The vehicle supplemental sensors 186 may not be able to gather data on the LZOI 514 due to distance or traffic interference. If the vehicles 522, 524 close to the LZOI 514 are connected vehicles, the vehicle 100 may request control of any available, controllable remote sensors mounted on these vehicles, if the sensors may be controlled so as to bring the LZOI 514 into their fields of view. These controllable sensors 522s, 524s may be movably mounted to their respective vehicles 522, 524 in a manner similar to the supplemental sensors of vehicle 100, and may comprise supplemental sensors of the vehicles 522 and 524. If control of the remote sensors 522s, 524s is available, the sensor control module 117 may control the sensors 522s, 524s to focus their fields of view on the LZOI 514, enabling data to be gathered on the LZOI. Thus, using the known navigational coordinates of the LZOI 514, the sensor control module 117 may control position and orientation of the supplemental sensors 186 and/or remote sensors 522s, 524s so as to bring at least a portion of the LZOI 514 into the field(s) of vision of the sensor(s) and maintain the at least a portion of the LZOI in the field(s) of vision of the sensor(s) as the vehicle 100 moves and as the connected vehicle(s) 522, 524 move.

In addition, as the sensors 522s, 524s of connected vehicles 522, 524 are no longer able to bear on the LZOI 514, the vehicle 100 may initiate communication with any other connectibly-configured vehicles approaching or near the LZOI 514 to determine if these vehicles have sensors available for temporary control by the sensor control module 117, to enable the LZOI to be monitored in conditions where sensors of the vehicle 100 will not bear on the LZOI yet. In this manner, if sufficient connectible vehicles with available sensors are present in the right locations, the sensors of a succession of connected vehicles may be temporarily controlled by vehicle 100 to provide a flow of sensor data relating to the LZOI 514 until supplemental sensors 186 of the vehicle 100 can bear on the LZOI.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4B, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module, as envisioned by the present disclosure, is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A sensor control system for a vehicle, the system comprising:
   one or more processors; and
   a memory communicably coupled to the one or more processors and storing:
     a zone of interest determination module including computer-readable instructions that when executed by the one or more processors cause the one or more processors to determine if at least one localized zone of interest resides within a preliminary zone of interest of the vehicle; and
     a sensor control module including computer-readable instructions that when executed by the one or more processors cause the one or more processors to:
     control one or more operational parameters of at least one sensor so as to, if the at least one localized zone of interest resides within the preliminary zone of interest, bring at least a portion of the at least one localized zone of interest into a of field view of the at least one sensor; and
   if at least a portion of the at least one localized zone of interest cannot be brought into a field of view of the at least one sensor:
     acquire control of at least one available remote sensor of a connectibly-configured other ground vehicle, the at least one available remote sensor being controllable so as to bring at least a portion of the at least one localized zone of interest into a field of view of the available remote sensor; and
     remotely control one or more operational parameters of the at least one available remote sensor so as to bring at least a portion of the at least one localized zone of interest into the field of view of the at least one available remote sensor until an alert is received from the connectibly-configured other ground vehicle stating that the connectibly-configured ground vehicle requires use of the at least one remote sensor currently being controlled by the sensor control module.

2. The sensor control system of claim 1 wherein the at least one sensor is at least one supplemental sensor of the vehicle, and wherein the sensor control module includes computer-readable instructions that when executed by the one or more processors cause the one or more processors to, prior to controlling one or more operational parameters of the at least one supplemental sensor:
   determine if the at least one localized zone of interest is in a field of view of the at least one supplemental sensor; and
   if the at least one localized zone of interest is not in a field of view of the at least one supplemental sensor, determine if one or more operational parameters of the at least one supplemental sensor can be controlled so as to bring at least a portion of the at least one localized zone of interest into a field of view of the at least one supplemental sensor.

3. The sensor control system of claim 1 wherein the zone of interest determination module includes computer-readable instructions that when executed by the one or more processors cause the one or more processors to determine the preliminary zone of interest of the vehicle responsive to determination of a next maneuver of the vehicle.

4. The sensor control system of claim 1 wherein the sensor control module includes computer-readable instructions that when executed by the one or more processors cause the one or more processors to continuously control the one or more operational parameters of the at least one sensor as the vehicle moves so as to maintain at least a portion of the at least one localized zone of interest in the field of view of the at least one sensor.

5. The sensor control system of claim 1 wherein the one or more operational parameters of the at least one sensor include a position of the at least one sensor with respect to a reference feature of a vehicle on which the at least one sensor is mounted.

6. The sensor control system of claim 1 wherein the one or more operational parameters of the at least one sensor include an orientation of the at least one sensor.

7. The sensor control system of claim 1 wherein the at least one sensor is a supplemental sensor of the vehicle.

8. The sensor control system of claim 1 wherein the zone of interest determination module includes computer-readable instructions that when executed by the one or more processors cause the one or more processors to:
   determine the localized zone of interest responsive to traffic condition information; and
   add the localized zone of interest to a digital map.

9. The sensor control system of claim 1 wherein the zone of interest determination module includes computer-readable instructions that when executed by the one or more processors cause the one or more processors to:
   determine the localized zone of interest responsive to road geometry information; and
   add the localized zone of interest to a digital map.

10. The sensor control system of claim 1 wherein the sensor control module includes computer-readable instructions that when executed by the one or more processors cause the one or more processors to continuously control the one or more operational parameters of the at least one available remote sensor as the connectibly-configured other ground vehicle on which the at least one available remote sensor is mounted moves, so as to maintain at least a portion of the at least one localized zone of interest in the field of view of the at least one available remote sensor until the at least one available remote sensor can no longer be controlled so as to bring at least a portion of the at least one localized zone of interest into the field of view of the at least one available remote sensor.

11. A vehicle including the sensor control system of if claim 1.

12. The sensor control system of claim 1 wherein the at least one available remote sensor is a supplemental sensor of the connectibly-configured other ground vehicle.

13. The sensor control system of claim 1 wherein the zone of interest determination module includes computer-readable instructions that when executed by the one or more processors cause the one or more processors to, if the zone of interest determination module determines that two or more localized zones of interest reside within the preliminary zone of interest and prior to the sensor control module controlling one or more operational parameters of the at least one sensor, prioritize the two or more localized zones of interest to determine a main localized zone of interest, and wherein the sensor control module includes computer-readable instructions that when executed by the one or more processors cause the one or more processors to control the one or more operational parameters of the at least one sensor so as to bring at least a portion of the main localized zone of interest into the field of view of the at least one sensor.

14. A non-transitory computer readable medium having stored therein instructions, that when executed by a computing system, cause the computing system to perform functions comprising:
   determining a preliminary zone of interest of a vehicle;
   determining if at least one localized zone of interest resides within the preliminary zone of interest of the vehicle;
   if at least one localized zone of interest resides within the preliminary zone of interest, controlling one or more operational parameters of at least one sensor so as to bring at least a portion of the at least one localized zone of interest into a field view of the at least one sensor;
   if the at least one localized zone of interest cannot be brought into a field of view of at least one sensor of the vehicle:
      acquiring control of at least one available remote sensor of a connectibly-configured other ground vehicle, the at least one available remote sensor being controllable so as to bring at least a portion of the at least one localized zone of interest into a field of view of the available remote sensor; and
      remotely controlling one or more operational parameters of the at least one available remote sensor so as to bring at least a portion of the at least one localized zone of interest into the field of view of the at least one available remote sensor until an alert is received from the connectibly-configured other ground vehicle stating that the connectibly-configured ground vehicle requires use of the at least one remote sensor currently being controlled.

15. The non-transitory computer readable medium of claim 14 having stored therein instructions, that when executed by a computing system, cause the computing system to perform functions further comprising continuously controlling one or more operational parameters of the at least one sensor as the vehicle moves so as to maintain at least a portion of the at least one localized zone of interest in the field of view of the at least one sensor.

16. A method for controlling at least one vehicle sensor, comprising steps of:
- determining a preliminary zone of interest of the vehicle;
- determining at least one localized zone of interest of the vehicle residing within the preliminary zone of interest;
- if the at least one localized zone of interest can be brought into a field of view of at least one sensor of the vehicle, controlling operation of the at least one sensor of the vehicle to bring at least a portion of the at least one localized zone of interest into the field of view of the at least one sensor of the vehicle;
- if the at least one localized zone of interest cannot be brought into a field of view of at least one sensor of the vehicle:
  - acquiring control of at least one available remote sensor of a connectibly-configured other ground vehicle, the at least one available remote sensor being controllable so as to bring at least a portion of the at least one localized zone of interest into a field of view of the available remote sensor; and
  - remotely controlling one or more operational parameters of the at least one available remote sensor so as to bring at least a portion of the at least one localized zone of interest into the field of view of the at least one available remote sensor until an alert is received from the connectibly-configured other ground vehicle stating that the connectibly-configured ground vehicle requires use of the at least one remote sensor currently being controlled.

17. The method of claim 16 further comprising the step of after controlling operation of the at least one sensor of the vehicle to bring at least a portion of the at least one localized zone of interest into the field of view of the at least one sensor of the vehicle, continuously controlling operation of the at least one sensor of the vehicle as the vehicle moves so as to maintain at least a portion of the at least one localized zone of interest in the field of view of the at least one sensor of the vehicle.

18. The method of claim 16 further comprising the steps of:
- if it is determined that two or more localized zones of interest reside within the preliminary zone of interest, prioritizing the two or more localized zones of interest to determine a main localized zone of interest; and
- controlling the one or more operational parameters of the at least one sensor so as to bring at least a portion of the main localized zone of interest into the field of view of the at least one sensor.

19. The method of claim 16 wherein the at least one available remote sensor is a supplemental sensor of the connectibly-configured other ground vehicle.

* * * * *